(12) United States Patent
Moriyama et al.

(10) Patent No.: US 9,140,935 B2
(45) Date of Patent: Sep. 22, 2015

(54) LIQUID CRYSTAL DISPLAY DEVICE

(71) Applicant: Japan Display Inc., Minato-ku (JP)

(72) Inventors: Naomi Moriyama, Saitama-ken (JP); Masakatsu Kitani, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 150 days.

(21) Appl. No.: 13/959,124

(22) Filed: Aug. 5, 2013

(65) Prior Publication Data

US 2014/0055727 A1 Feb. 27, 2014

(30) Foreign Application Priority Data

Aug. 27, 2012 (JP) ................................. 2012-186933

(51) Int. Cl.
*G02F 1/1343* (2006.01)

(52) U.S. Cl.
CPC .... *G02F 1/134309* (2013.01); *G02F 1/134363* (2013.01); *G02F 2001/134372* (2013.01)

(58) Field of Classification Search
CPC .............. G02F 2001/134372; G02F 1/134363; G02F 1/134306
USPC ......................................................... 349/141
See application file for complete search history.

(56) References Cited

U.S. PATENT DOCUMENTS

2012/0112200 A1* 5/2012 Nagano ........................... 257/72

FOREIGN PATENT DOCUMENTS

| JP | 2007-334222 | 12/2007 |
| JP | 2010-286575 | 12/2010 |

* cited by examiner

*Primary Examiner* — James Dudek
(74) *Attorney, Agent, or Firm* — Oblon, McClelland, Maier & Neustadt, L.L.P.

(57) ABSTRACT

In an array substrate, a first pixel is arranged at one end of an active area, and a second pixel is arranged adjacent to the first pixel more inside of the active area than the first pixel. A common electrode extends to the first and second pixels, and an insulating layer is formed on the common electrode. First and second pixel electrodes are formed on the insulating layer in the first and second pixels. The pixel electrodes include electrode portions forming slits facing the common electrode. A second substrate includes a shield layer arranged outside the active area. The first pixel electrode is formed more widely than the second pixel electrode, and extends to outside of the active area. The first pixel electrode includes an extending portion extending to outside of the active area and facing the shield layer.

14 Claims, 6 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2012-186933 filed Aug. 27, 2012, the entire contents of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and a PDA (personal digital assistant), a car navigation equipment, and a game machine.

Generally, the liquid crystal display panel in Fringe Field Switching (FFS) mode includes an array substrate equipped with a pixel electrode and a common electrode, a counter substrate and a liquid crystal layer held therebetween. In the FFS mode, alignment of liquid crystal molecules is controlled using the fringe electric field formed between the pixel electrode and the common electrode.

Technology for arranging a dummy pixel in a non-display area covered with a shield layer is proposed as an example in the FFS mode. While the structure of the dummy pixel is substantially the same as the pixel in a display area, the dummy pixel is constituted so that electric field may not be impressed to the liquid crystal layer. The dummy pixel is used in order to form a protection device against static electricity which invades from the outside.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
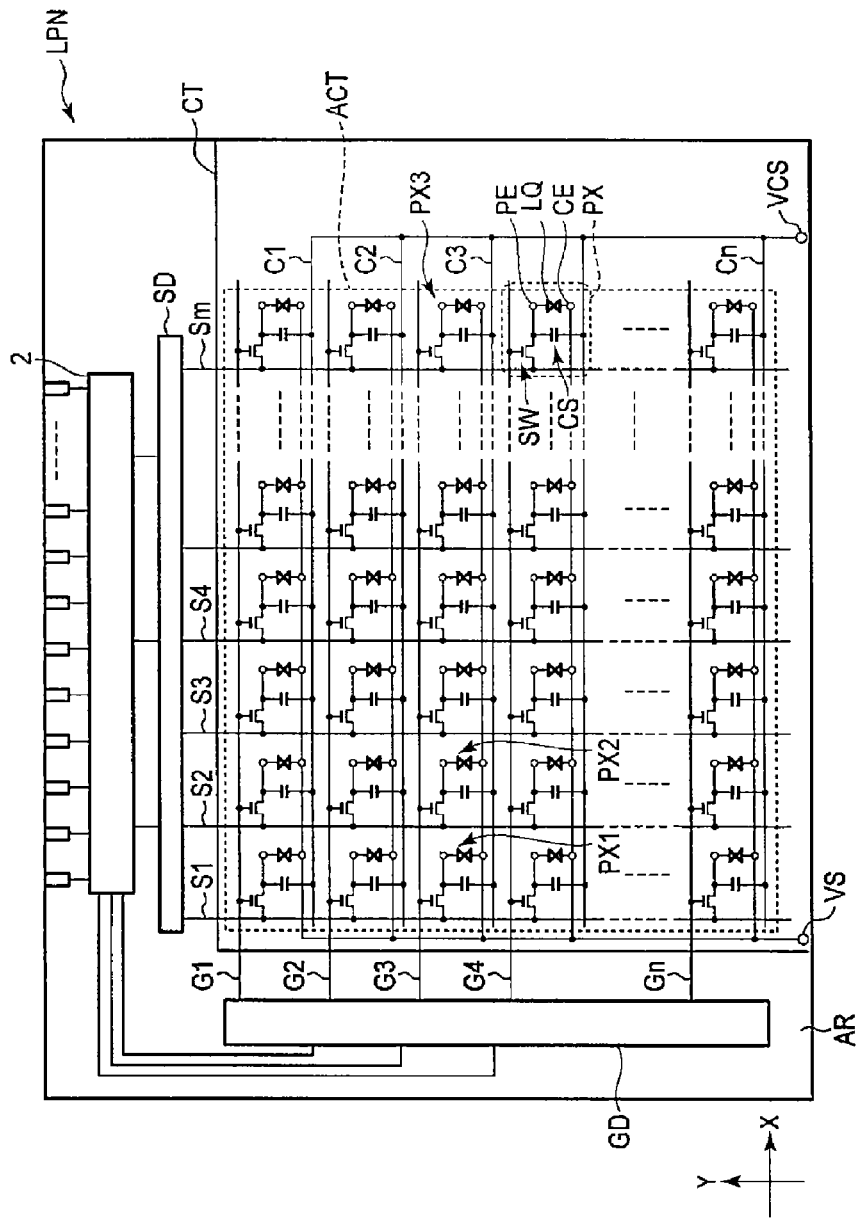
FIG. 1 is a view schematically showing a structure of a liquid crystal display device and its equivalent circuit according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first pixel arranged in one end of an active area for displaying images, and a second pixel adjacent to the first pixel in a first direction and located inside of the active area, a common electrode set to a common voltage and extending to the first and second pixels, an insulating layer formed on the common electrode, a first pixel electrode formed on the insulating layer in the first pixel, the first pixel electrode including a first electrode portion forming a first slit extending in a second direction orthogonally crossing the first direction and facing the common electrode, a second pixel electrode formed on the insulating layer in the second pixel, the second pixel electrode including a second electrode portion forming a second slit extending in the second direction and facing the common electrode, and a first alignment film covering the first and second pixel electrodes, a second substrate including; a shield layer including a first segment formed in a lattice shape extending in the first and second directions in the active area and a second segment arranged outside the active area, and a second alignment film facing the first alignment film, a liquid crystal layer held between the first alignment film and the second alignment film and having liquid crystal molecules; wherein the first pixel electrode is formed more widely than the second pixel electrode in the first direction, and extends to outside of the active area, and the first pixel electrode includes an extending portion extending to outside of the active area and facing the second segment of the shield layer.

According to other embodiment, a liquid crystal display device, includes: a first substrate including; a switching element arranged in outermost pixels located at an end of an active area for displaying images, a common electrode set to a common voltage, an insulating layer formed on the common electrode, a pixel electrode formed on the insulating layer and electrically connected with the switching element in the outermost pixels, and a first alignment film covering the pixel electrode, a second substrate including; a shield layer having a first segment extending in a first direction outside of the active area, and a second segment adjoining the first segment in a second direction orthogonally crossing the first direction and extending in the first direction in the active area so as to interpose the pixel electrode therebetween, and a second alignment film facing the first alignment film, a liquid crystal layer held between the first alignment film and the second alignment film; wherein the pixel electrode includes an electrode portion facing the common electrode and forming a slit extending in the first direction, and an end of the pixel electrode faces the first segment of the shield layer, and the other end of the pixel electrode forms a transmissive region between the other end and the second segment.

FIG. 1 is a view schematically showing a structure of a liquid crystal display device and its equivalent circuit according to one embodiment.

The liquid crystal display device includes a transmissive active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. For example, the active area ACT is formed in a rectangular shape. The active area ACT is constituted with a plurality of pixels PX arranged in the shape of a (m×n) matrix (here, "m" and "n" are positive integers). In this embodiment, the active area ACT includes a first pixel PX1 (outermost pixel) located at a left-hand side end of the active area ACT along a first direction X, and a second pixel PX2 adjacent to the first pixel PX1 in the first direction X, and are located more inside the active area ACT than the first pixel PX1.

The array substrate AR is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in the first direction X, respectively. The source lines S extend in a second direction orthogonally crossing the first direction X. Furthermore, the array substrate AR includes a switching element SW electrically connected with the gate line G and the source line S in each pixel PX, a pixel electrode PE electrically connected with the switching element SW in each pixel PX and a common electrode CE facing the pixel electrode PE.

The switching elements SW is formed of either a top-gate type or a bottom-gate type thin film transistor (TFT). The switching element SW includes a semiconductor layer formed of poly-silicon or amorphous silicon. The common electrode CE is formed in common to a plurality of pixels PX. Each pixel electrode PE is formed in an island shape in each pixel PX.

Each gate line G is pulled out to outside of the active area ACT, and connected to a gate driver GD. Each source line S is pulled out to the outside of the active area ACT and connected to a source driver SD. Each capacitance line C is pulled out to the outside of the active area ACT and electrically connected with a voltage impressing portion VCS to which auxiliary capacitance voltage is supplied. The common electrode CE is electrically connected with an electric supply portion VS to which common voltage is supplied. At least a portion of the gate driver GD and the source driver SD is formed in the array substrate AR, for example, and connected with the driver IC chip 2. In this embodiment, the driver IC chip 2 for driving the liquid crystal panel LPN as a signal source is mounted on the array substrate AR outside of the active area ACT in the liquid crystal panel LPN.

Moreover, the liquid crystal display panel LPN shown in the figure is constituted applicable to the FFS mode or the IPS mode, and includes the pixel electrode PE and the common electrode CE in the array substrate AR. In the liquid crystal display panel LPN, the liquid crystal molecules which constitute the liquid crystal layer LQ are switched mainly using lateral electric field (for example, electric field component of the fringe electric field substantially in parallel to a principal surface of the substrate) formed between the pixel electrode PE and the common electrode CE.

Figure 2:
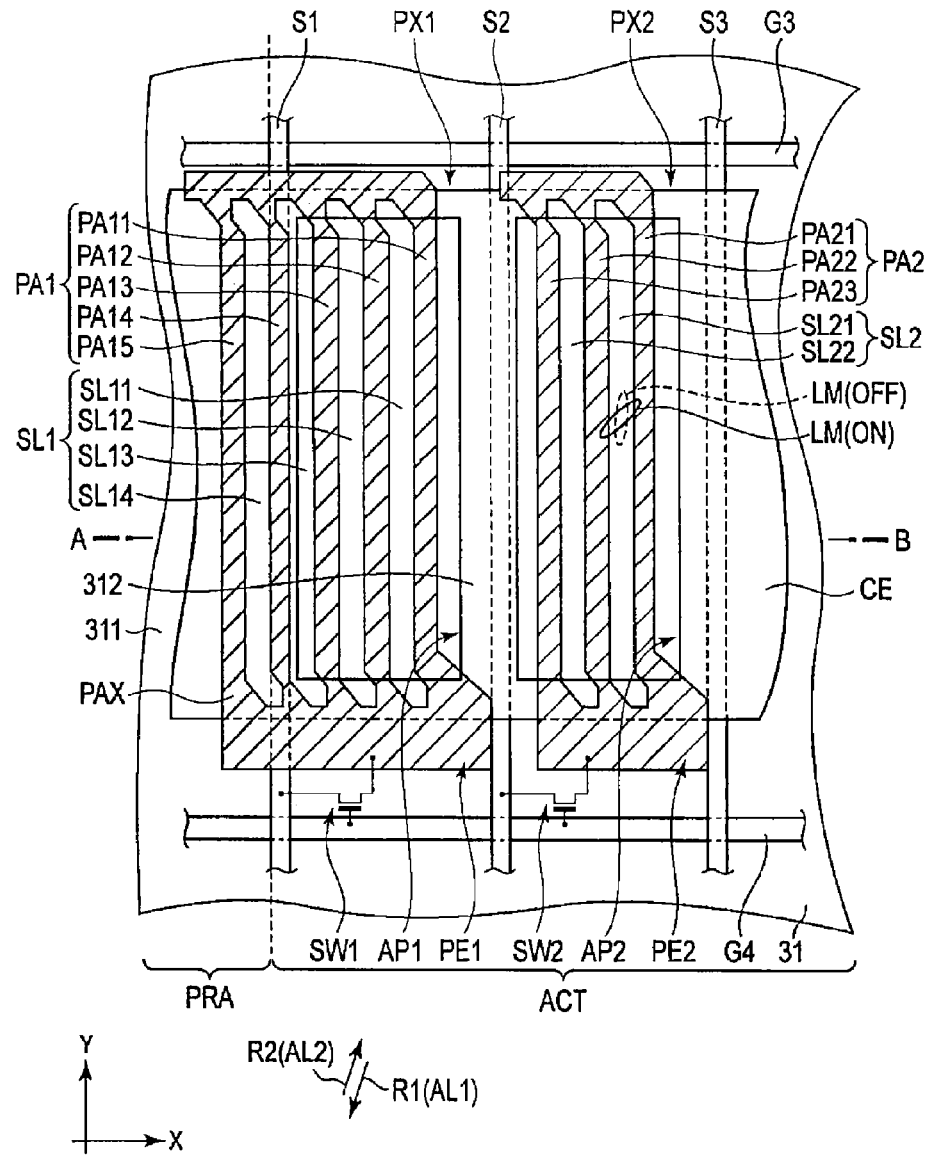
FIG. 2 is a plan view schematically showing structures of a first pixel and a second pixel in an array substrate shown in FIG. 1 according to a first embodiment, when seeing from a counter substrate side.

FIG. 2 is a plan view schematically showing structures of the first pixel and the second pixel electrode in the array substrate shown in FIG. 1, when seeing from the counter substrate side.

A gate line G3 and a gate line G4 extend along the first direction X, respectively. The gate line G3 and the gate line G4 are arranged with a first pitch along the second direction Y. A source line S1, a source line S2, and a source line S3 extend along the second direction Y, respectively. The source lines S1, S2, and S3 are arranged with a second pitch along the first direction X, respectively. Here, the first pitch is larger than the second pitch. The first pixel PX1 is defined by the gate line G3, the gate line G4, the source line S1, and the source line S2. The second pixel PX2 is defined by the gate line G3, the gate line G4 and the source line S2, and the source line S3. The first pixel PX1 and the second pixel PX2 have a vertical long rectangular shape whose length in the first direction X is shorter than the length in the second direction Y, for example.

The first pixel PX1 is equipped with a switching element SW1 electrically connected with the gate line G4 and the source line S1, and a pixel electrode PE1 electrically connected with the switching element SW1. The second pixel PX2 is equipped with a switching element SW2 electrically connected with the gate line G4 and the source line S2, and a pixel electrode PE2 electrically connected with the switching element SW2.

The common electrode CE set to a common voltage extends in the first direction X, and is formed in common to a plurality of pixels PX adjoining in the first direction X as shown in the figure. That is, the common electrode CE is arranged in the first pixel PX1 and the second pixel PX2 respectively striding above the source line S1, the source line S2, and the source line S3, respectively. The common electrode CE counters with the pixel electrode PE1 in the first pixel PX1, and the pixel electrode PE2 in the second pixel PX2. The pixel electrode PE1 and the pixel electrode PE2 are formed in the shape of an island corresponding to rectangular pixel form, respectively.

The pixel electrode PE1 includes a first electrode portion PA1 which forms a first slit SL1 facing the common electrode CE and extending in the second direction Y. In this embodiment, the pixel electrode PE1 includes five electrode portions PA11 to PA15 and four slits SL11 to SL14 extending along the second direction Y, respectively. That is, each of the slits SL11 to SL14 has a long axis in parallel to the second direction Y. Hereinafter, more detailed form of the pixel electrode PE1 is explained.

The slits SL11 to SL14 are arranged in a line along the first direction X. The slits SL11 to SL14 are formed so that they may have substantially the same width along the first direction X. The electrode portions PA11 to PA15 are located in a line along the first direction X. All of the electrode portions PA11 to PA15 all have substantially the same electrode width along the first direction X. The slit SL11 is formed between the electrode portion PA11 and the electrode portion PA12. The slit SL12 is formed between the electrode portion PA12 and the electrode portion PA13. The slit SL13 is formed between the electrode portion PA13 and the electrode portion PA14. The slit SL14 is formed between the electrode portion PA14 and the electrode portion PA15.

The pixel electrode PE2 includes a second electrode portion PA2 which forms the second slit SL2 facing the common electrode CE and extending in the second direction Y. In this embodiment, the pixel electrode PE2 includes three electrode portions PA21 to PA23 and two slits SL21 and SL22 extending, respectively, in the second direction Y. That is, each of the slits SL21 to SL22 has a long axis in parallel to the second direction Y. Hereinafter, more detailed form of the pixel electrode PE2 is explained.

The slits SL21 and SL22 are arranged in a line along the first direction X. The slits SL21 and SL22 are formed so that they may have substantially the same width along the first direction X. The electrode portions PA21 to PA23 are arranged in a line along the first direction X. All of the electrode portions PA21 to PA23 have substantially the same electrode width along the first direction X. The slit SL21 is formed between the electrode portion PA21 and the electrode portion PA22. The slit SL22 is formed between the electrode portion PA22 and the electrode portion PA23.

Although not illustrated, the structure of the outermost pixels (pixels PX arranged between the source line S1 and the source line S2) located in the left-hand side end of the active area ACT is the same as the pixel PX1 and equipped with a pixel electrode of the same form as the pixel electrode PE1. Moreover, the structure of the pixels arranged inside the outermost pixels PX in the active area ACT is the same as the structure of the pixel PX2 and equipped with a pixel electrode of the same form as the pixel electrode PE2.

Each of the slits SL11 to SL14 in the pixel electrode PE1 and the slits SL21 and SL22 in the pixel electrode PE2 becomes a penetration region which can penetrate backlight from a backlight to be mentioned later.

The shield layer 31 to be mentioned later counters wiring portions, such as the gate line G, the source line S, and the switching element SW formed in the array substrate AR. That is, in the active area ACT, the shield layer 31 extends in the first direction X and the second direction Y, and is formed in the shape of a lattice. Moreover, the shield layer 31 is arranged also on the outside area PRA of the active area ACT. Although not explained in detail, the shield layer 31 is formed in the shape of a frame surrounding the active area ACT in the outside area PRA of the active area ACT.

In this embodiment, the shield layer 31 faces the gate line G3, the gate line G4, the source line S1, the source line S2, the source line S3, and the switching element SW1, and switching element SW2, and moreover extends to a region outside the first pixel PX1 i.e., more outside than the left-hand side end of the active area. The shield layer 31 includes an approximately rectangular aperture AP1 corresponding to the first pixel PX1 while including an approximately rectangular aperture AP2 corresponding to the second pixel PX2.

The illustrated shield layer 31 includes a segment 311 extending along the second direction Y on the outside area PRA of the active area ACT, and a segment 312 adjoining the segment 311 in the first direction X, and extending along the second direction Y in the active area ACT. The segment 312 is located between the aperture AP1 and the aperture AP2.

Here, positional relationship among the pixel electrodes PE1 and PE2, and the shield layer 31.

Each second electrode portion PA2 constituting the pixel electrode PE2 is located inside the aperture AP2. That is, the electrode portion PA21 and the electrode portion PA23 located in the both ends of the pixel electrode PE2 do not overlap with the shield layer 31, but form a penetration region between the electrode portions PA21 and PA23 and the shield layer 31. For example, between the electrode portion PA23 and the segment 312, the same penetration region as the slit SL21, etc., is formed.

The pixel electrode PE1 is formed more widely than the pixel electrode PE2 along the first direction X. That is, the pixel electrode PE1 extends in the outside area PRA of the active area ACT and includes an extending portion PAX facing the shield layer 31. In this embodiment, the number of the first slits SL1 in the pixel electrode PE1 is larger than the number of the second slits SL2 in the pixel electrode PE2. That is, the number of the first electrode portions PA1 is larger than the number of the second electrode portions PA2. The extending portion PAX includes a first electrode portion PA15 and a first slit SL14 which are respectively located in the opposite end to the pixel electrode PE2.

All of the electrode portions PA11 to PA13 are located inside the aperture AP1 among the first electrode portions PA1 which constitute the pixel electrode PE1. Moreover, all of the slits SL11 to SL13 among first slit SL1 are located inside the aperture AP1. That is, the electrode portions PA11 to PA13 do not overlap with the shield layer 31. Between the electrode portion PA11 and the segment 312, the same penetration region as the slit SL11, etc., is formed. On the other hand, the electrode portions PA14 and PA15 among the first electrode portion PA1 overlap with the segment 311 of the shield layer 31. Moreover, the slit SL14 also overlaps with the segment 311. Thus, one end portion (left-hand side end in the figure) of the pixel electrode PE1 extends to the outside area PRA of the active area ACT and faces the segment 311 of the shield layer 31. The other end portion (right-hand side end in the figure) of the pixel electrode PE1 is constituted so that the other end portion may form a penetration region between the other end portion and the segments 312 of the shield layer 31.

Figure 3:
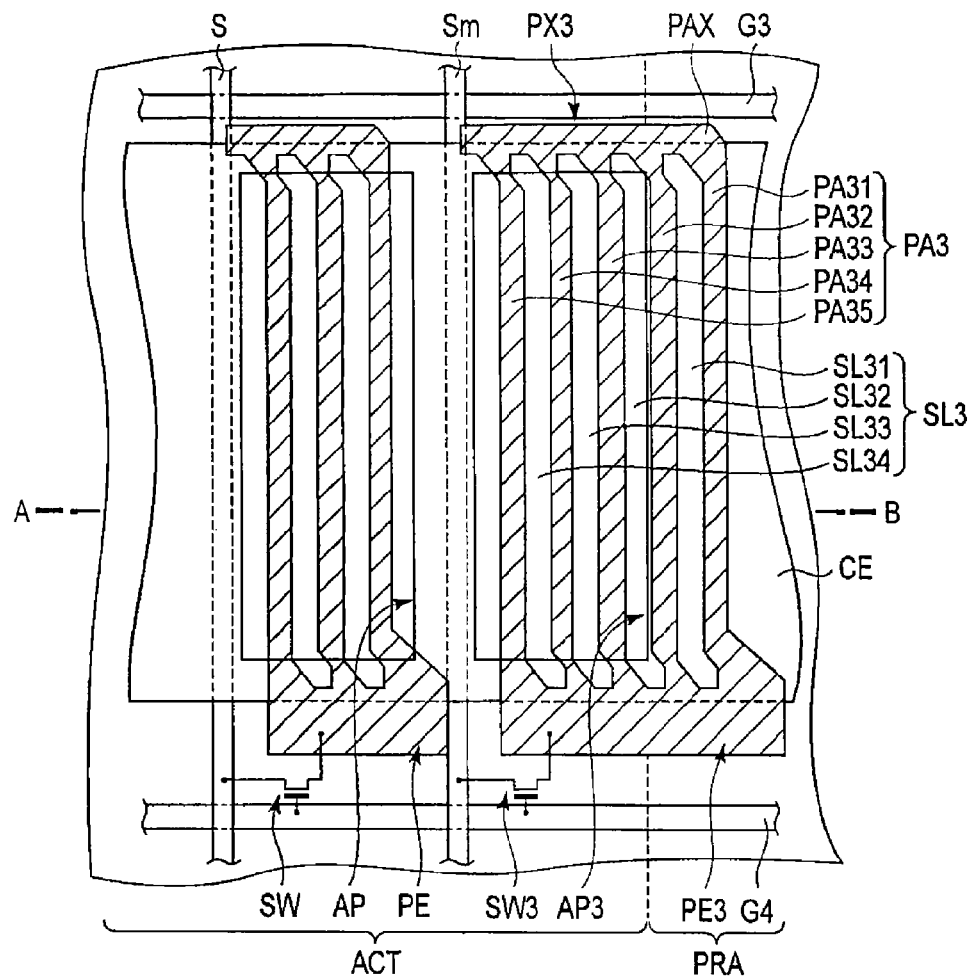
FIG. 3 is a plan view schematically showing the structure of other pixel in the array substrate shown in FIG. 1, when seeing from a counter substrate side.

FIG. 3 is a plan view schematically showing structure of other pixel in the array substrate AR shown in FIG. 1, when seeing from the counter substrate side.

Among the pixels PX arranged between the gate line G3 and the gate line G4, a third pixel PX3 located in the other end (right-hand end of the active area) in the first direction X in the active area ACT corresponds to the outermost pixel as well as the first pixel PX1. The third pixel PX3 includes a switching element SW3 electrically connected with the gate line G4 and the source line Sm, and a pixel electrode PE3 electrically connected with the switching element SW3.

The pixel electrode PE3 includes a third electrode portion PA3 which forms a third slit SL3 facing the common electrode CE and extending in the second direction Y. In this embodiment, the pixel electrode PE3 includes five electrode portions PA31 to PA35 and four slits SL31 to SL34 arranged in a line along the first direction X, and extending in the second direction Y, respectively.

The pixel electrode PE3 is formed more widely than above pixel electrode PE2 along the first direction X and has substantially the same width as the pixel electrode PE1. The pixel electrode PE3 extends to the outside area PRA of the active area ACT and includes an extending portion PAX extending in the outside area PRA of the active area ACT facing the shield layer 31 as well as the first pixel electrode PE1. Although not explained in detail, the extending portion PAX includes a third electrode portion (PA31 and PA32) and the third slit (SL31).

All the electrode portions PA33 to PA35 are located inside the aperture AP among the third electrode portion PA3 shown in the figure. Moreover, all of the slits SL32 to SL34 among the third slits SL3 are located inside the aperture AP. That is, the electrode portions PA33 to PA35 do not overlap with the shield layer 31. Thus, also in the third pixel electrode PE3, one end portion (right-hand end in the figure) of the pixel electrode PE3 extends to the outside area PRA of the active area ACT and faces the shield layer 31 as well as the first pixel electrode PE1. The other end portion (left-hand end in the figure) of the pixel electrode PE3 is constituted so that the other end portion may form a penetration region between the other end portion and the shield 31.

Figure 4:
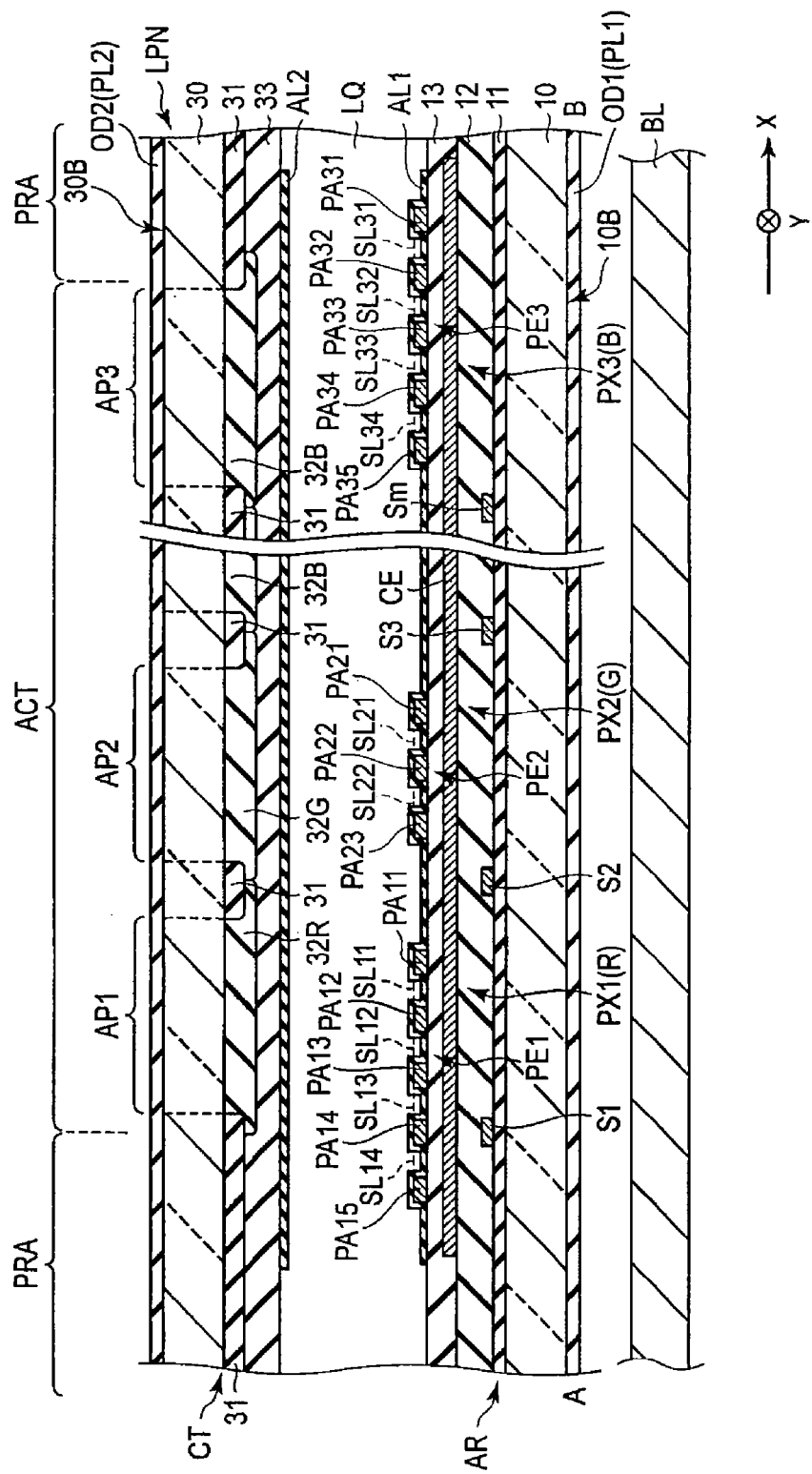
FIG. 4 is a cross-sectional view schematically showing the structure of the liquid crystal display panel including the first and second pixels taken along line A-B shown in FIGS. 2 and 3.

FIG. 4 is a cross-sectional view schematically showing the structure of the liquid crystal display panel including the first and second pixels taken along line A-B shown in FIGS. 2 and 3.

The array substrate AR is formed using a first insulating substrate 10 which has light transmissive characteristics, such as a glass substrate and a resin substrate. The array substrate AR includes switching element which is not illustrated, source lines S1 to S3, Sm, a common electrode CE, pixel electrodes PE1 to PE3, a first insulating film 11, a second insulating film 12, a third insulating film 13, and a first alignment film ALL etc., respectively, formed on the first substrate 10 facing the counter substrate CT.

The first insulating film 11 is arranged on the first insulating substrate 10. The source lines S1 to S3, Sm, etc., are formed on the first insulating film 11 and covered with the second insulating film 12. The second insulating film 12 is arranged also on the first insulating film 11.

The common electrode CE is formed on the second insulating film 12. The common electrode CE is formed by transparent electric conductive material, for example, Indium Tin Oxide (ITO), Indium Zinc Oxide (IZO), etc. The common electrode CE is covered with the third insulating film 13. The third insulating film 13 is also arranged on the second insulating film 12.

The pixel electrodes PE1 to PE3 are formed on the third insulating film 13, respectively, and face the common electrode CE. The pixel electrodes PE1 to PE3 are formed by transparent electric conductive material, for example, ITO, IZO, etc. The pixel electrodes PE1 to PE3 are covered with the first alignment film AL1. The first alignment film AL1 also covers the third insulating film 13. The first alignment film AL1 is formed of the material which shows horizontal alignment characteristics.

On the other hand, the counter substrate CT is formed using a second insulating substrate 30 such as a glass substrate and a resin substrate, etc., which has transmissive characteristics. The counter substrate CT includes the shield layer 31, a color filter 32, an overcoat layer 33, and the second alignment film AL2, etc., on the second insulating substrate 30 facing the array substrate AR.

The shield layer 31 defines each pixel PX in the active area ACT, and forms the apertures AP1 to AP3. The shield layer 31 is arranged so that the shield layer 31 counters wiring portions, such as the gate line and the switching element which are not illustrated, the source lines S1 to S3, Sm. Moreover, the shield layer 31 also extends to outside area PRA of the active area ACT.

The color filter 32 is arranged corresponding to each pixel PX. That is, the color filter 32 is arranged in the apertures AP1 to AP3, and a portion thereof runs on the shielding layer 31. The colors of the color filter 32 arranged in adjoining pixels PX in the first direction X differ mutually. For example, the color filter 32 is formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. In this embodiment, the first pixel PX1 corresponds to the red pixel (R), and a red color filter 32R is arranged in the aperture AP1. The second pixel PX2 corresponds to the green pixel (G), and a green color filter 32G is arranged in the aperture AP2. The third pixel PX3 corresponds to the blue pixel (B), and the blue color filter 32B is arranged in the aperture AP33. The boundary between the adjoining color filters 32 is located in a position which overlaps with the shield layer 31.

The overcoat layer 33 covers the color filter 32. The overcoat layer 32 eases influence of concave-convex of the surface of the shield layer 31 and the color filter 32. That is, the surface of the overcoat layer 33 facing the array substrate AR is substantially flat. The overcoat layer 33 is formed of a transparent resin material. The surface of the overcoat layer 33 is covered with the second alignment film AL2. The second alignment film AL2 is formed of material which shows horizontal alignment characteristics.

In the pixel electrode PE1, the slits SL11 to SL13 and the electrode portions PA11 to PA13 face the aperture AP1 and the red color filter 32R. Moreover, in the pixel electrode PE1, the slit SL14, and the electrode portions PA14 and PA15 face the shield layer 31, respectively. In the pixel electrode PE3, the slits SL32 to SL34 and electrode portions PA33 to PA35 face the aperture AP3 and the blue color filter 32B. Moreover, the slit SL31, and the electrode portions PA31 and PA32 face the shield layer 31. In addition, the pixel electrode PE2 faces the aperture AP2 and the green color filter 32G. The pixel electrode PE3 faces the aperture AP3 and the blue color filter 32B.

The array substrate AR and the counter substrate CT as mentioned above are arranged so that the first alignment film AL1 and the second alignment film AL2 face each other. At this time, a predetermined cell gap is formed by a pillar-shaped spacer formed in one of the substrates between array substrate AR and the counter substrate CT. The array substrate AR and the counter substrate CT are pasted together by a seal material while the cell gap is formed. The liquid crystal layer LQ is constituted by liquid crystal composite containing liquid crystal molecules LM enclosed in the cell gap formed between the first alignment film AL1 of the array substrate AR and the second alignment film AL2 of the counter substrate CT. The liquid crystal layer LQ is formed of liquid crystal materials with positive dielectric constant anisotropy, for example.

A backlight 4 is arranged on the back side of the array substrate AR. Various types of backlights can be used. For example, a light emitting diode (LED) and a cold cathode fluorescent lamp (CCFL), etc., can be applied as a light source of the backlight 4, and the explanation about its detailed structure is omitted.

A first optical element OD1 having a first polarization plate PL1 is arranged on an external surface of the array substrate AR, i.e., an external surface 10B of the first insulating substrate 10. Moreover, a second optical element OD2 having a second polarization plate PL2 is arranged on an external surface of the counter substrate CT, i.e., an external surface 30B of the second insulating substrate 30. The first polarization axis of the first polarization plate PL1 and the second polarizing axis of the second polarization plate PL2 are arranged in Cross Nicole's positional relationship, for example.

As shown in FIG. 2, alignment treatment, for example, rubbing treatment or light alignment treatment, is carried out to the first alignment film AL1 and the second alignment film AL2 in a parallel direction each other, in a face in parallel to a substrate principal surface (or X-Y plane). The alignment treatment of the first alignment film AL1 is carried out in a direction intersecting with an acute angle of 45° or less to the second direction Y. The alignment treatment direction R1 of the first alignment film AL1 and the alignment treatment direction R2 of the second alignment film AL2 are directions which cross the second direction Y with angle of 5°-15° to the second direction Y, for example. In addition, the alignment treatment direction R1 and the alignment treatment direction R2 are opposite directions mutually.

In addition, the first polarizing axis of the first polarization plate PL1 is set to a substantially parallel direction to the alignment treatment direction R1 of the first alignment film AL1, and the second polarizing axis of the second polarization plate PL2 is set to a direction orthogonally crossing the alignment treatment direction R1 of the first alignment film AL.

Hereinafter, an operation example (normally black) in the liquid crystal display device according to this embodiment is explained.

At the time of OFF when a voltage forming potential difference between the pixel electrode PE and the common electrode CE is not impressed, the voltage is not impressed to the liquid crystal layer LQ, and electric field is not formed between the pixel electrode PE and the common electrode CE. For this reason, as shown with a dotted line in FIG. 2, the liquid crystal molecules LM contained in the liquid crystal layer LQ initially align in the alignment treatment directions of the first alignment film AL1, and the second alignment film AL2 in the X-Y plane. The alignment direction to which the liquid crystal molecules LM initially align is called an initial alignment direction. At the time of OFF, a portion of the backlight from the backlight BL penetrates the first polarization plate PL1, and enters into the liquid crystal display panel LPN. The backlight which entered into the liquid crystal display panel LPN is linearly polarized light which intersects perpendicularly with the first polarizing axis of the first polarization plate PL1. When the polarization state of the linearly polarized light passes the liquid crystal display panel LPN at the time of OFF, the polarization state hardly changes. For this reason, the linearly polarized light penetrating the liquid crystal display panel LPN is absorbed by the second polarization plate PL2 arranged in Gross Nicole's positional relationship with respect to the first polarization plate PL1 (black display).

On the other hand, when a voltage forming potential difference between the pixel electrode PE and the common electrode CE is impressed, the voltage is impressed to the liquid crystal layer LQ, and the fringe electric field is formed between the pixel electrode PE and the common electrode CE. For this reason, as shown with a solid line in FIG. 2, the liquid crystal molecules LM contained in the liquid crystal layer LQ aligns in a different direction from the initial alignment direction in the X-Y plane. In the positive type liquid crystal material, the liquid crystal molecules LM align so that the long axis of the liquid crystal molecules LM aligns in parallel to the electric field. In this ON time, the linearly polarized light orthogonally crossing the first polarizing axis of the first polarization plate PL1 enters in the display panel LPN. The polarization state of the linearly polarized light changes in accordance with the alignment state (or retardation) of the liquid crystal molecule LM when passing the liquid crystal layer LQ. Therefore, at the ON time, at least a portion of the backlight which passes the liquid crystal layer LQ penetrates the second polarization plate PL2 (white display).

By the way, in the FFS mode which controls the liquid crystal molecule LM using the fringe electric field, when the third insulating film 13 located between the common electrode CE and the pixel electrode PE is charged in a manufacture process, etc., electric charges may be localized in the outermost circumference in the active area, and may give a bad influence on the display. Accordingly, a display defect may be generated PX in the pixels including the first pixel PX1 arranged in the second direction Y in an outermost circumference of the left-hand side end or the pixels including the third pixel PX3 arranged in the second direction Y in an outermost circumference of the right-hand side en,. That is, even at the OFF state in which electric field is not formed between the pixel electrode PE and the common electrode CE, the alignment of the liquid crystal molecule LM is disordered due to the influence by the localized electric charges.

Especially, in case of normally black, the backlight leaks even in a black display. Accordingly, the backlight leak causes deterioration of display grace.

In this embodiment, in the first pixel PX1, the pixel electrode PE1 is widened in the first direction X so that the pixel electrode PE1 faces the aperture AP1 and the shield layer 31 in the outside area PRA of the active area ACT. Similarly, in the third pixel PX3, the pixel electrode PE3 is widened in the first direction X so that the pixel electrode PE3 faces the aperture AP3 and the shield layer 31 of the outside area PRA of the active area ACT. Thereby, the region which locally holds the undesirable electric charges between the pixel electrode PE1 and the common electrode CE or between the pixel electrode PE3 and the common electrode CE is located in the outside area PRA of the active area ACT. For this reason, even if the third insulating film 13 is charged and the electric charges are localized, since the region in which the alignment of the liquid crystal molecule LM is disordered is shielded by the shield layer 31, it becomes possible to control the optical leak in the active area ACT and also to control the deterioration of display grace.

Figure 5:
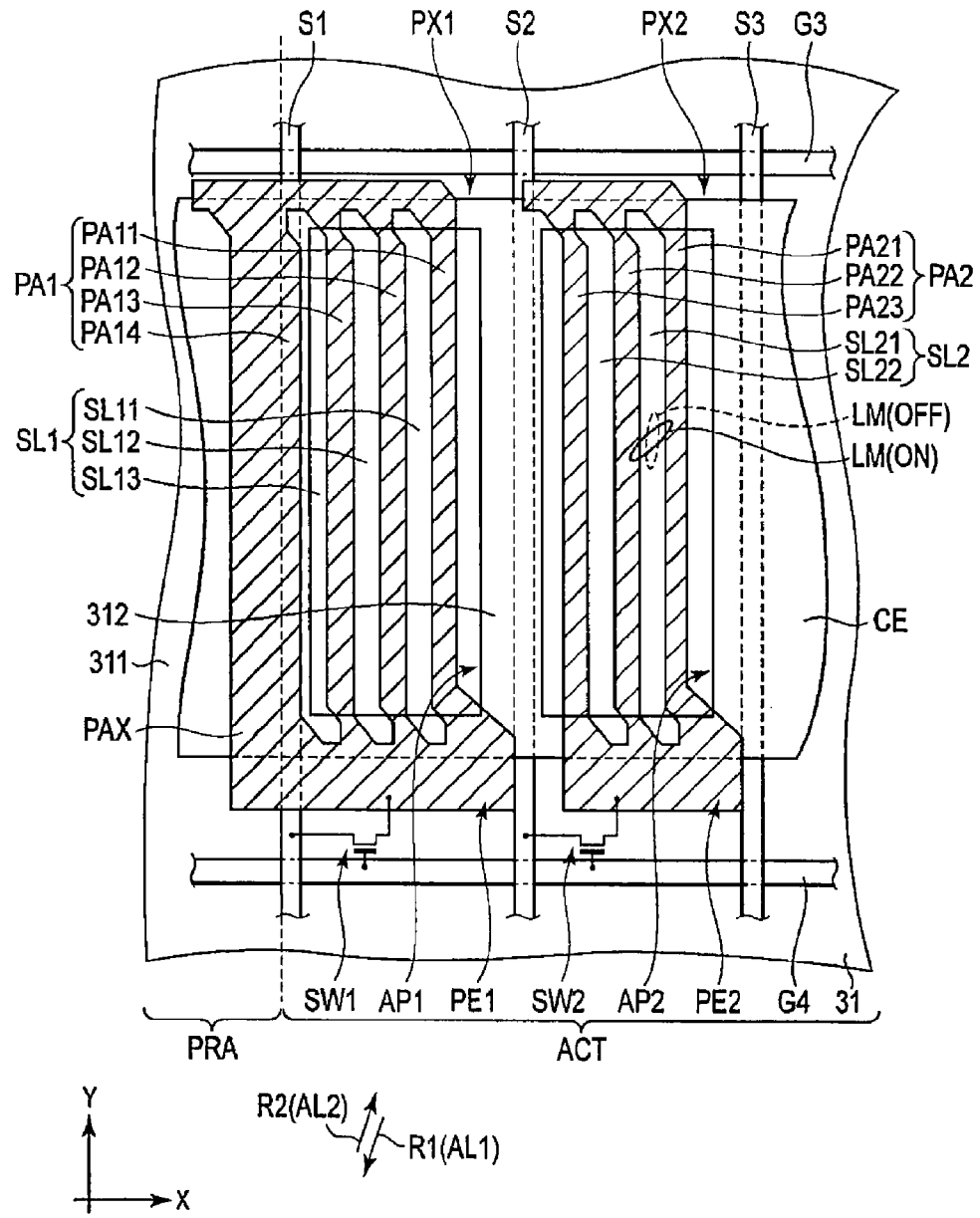
FIG. 5 is a plan view schematically showing the structure of the first pixel in the array substrate shown in FIG. 1 according to a second embodiment, when seeing from the counter substrate side.

Next, a second embodiment is explained. In addition, the same referential mark is attached to the same elements as the above structure, and detailed explanation is omitted. FIG. 5 is a plan view schematically showing other structure of the first pixel PX1 in the array substrate AR shown in FIG. 1, when seeing from the counter substrate side.

This embodiment is different from the first embodiment shown in FIG. 2 in that the electrode portion PA14 of the pixel electrode PE1 is widened to form the extending portion PAX. In addition, the structure of the pixel electrode PE2 is the same as that of the above-mentioned first embodiment.

In this embodiment, the pixel electrode PE1 includes four electrode portions PA11 to PA14 arranged in the first direction X so as to extend in the second direction Y, respectively, and three slits SL11 to SL13 arranged in the first direction X and extending in the second direction Y, respectively. All of the electrode portions PA11 to PA13 have substantially the same width in the first direction X. The width of the electrode portion PA14 in the first direction X is wider than the width of the electrode portion PA13, et al., in the first direction X. The slit SL11 is formed between the electrode portion PA11 and the electrode portion PA12. The slit SL12 is formed between the electrode portion PA12 and the electrode portion PA13. The slit SL13 is formed between the electrode portion PA13 and the electrode portion PA14.

The pixel electrode PE1 is wider than the pixel electrode PE2 along the first direction X and includes an extending portion PAX extending to the outside area PRA of the active area ACT. In this embodiment, the number of the first slits SL1 in the pixel electrode PE1 is larger than the number of the second slits SL2 in the pixel electrode PE2. That is, the number of the first electrode portions PA1 is larger than the number of the second electrode portions PA2.

Here, if its attention is paid to the positional relationship between the pixel electrode PE1 and the shield layer 31, the three electrode portions PA11 to PA13 in the first electrode portion PA1 which constitutes the pixel electrode PE1 are located inside of the aperture AP1. Furthermore, all the slits SL11 to SL13 are located inside of the aperture AP1. That is, the electrode portions PA11 to PA13 do not overlap with the shield layer 31. On the other hand, the electrode portion PA14 overlaps with the segment 311 of the shield layer 31 among the first electrode portions PA1. That is, the extending portion PAX corresponds to the electrode portion PA14 located at the opposite end to, the pixel electrode PE2. In addition, the illustrated extending portion PAX includes neither of the slits.

Also in the second embodiment, the same effect is acquired as the first embodiment.

Figure 6:
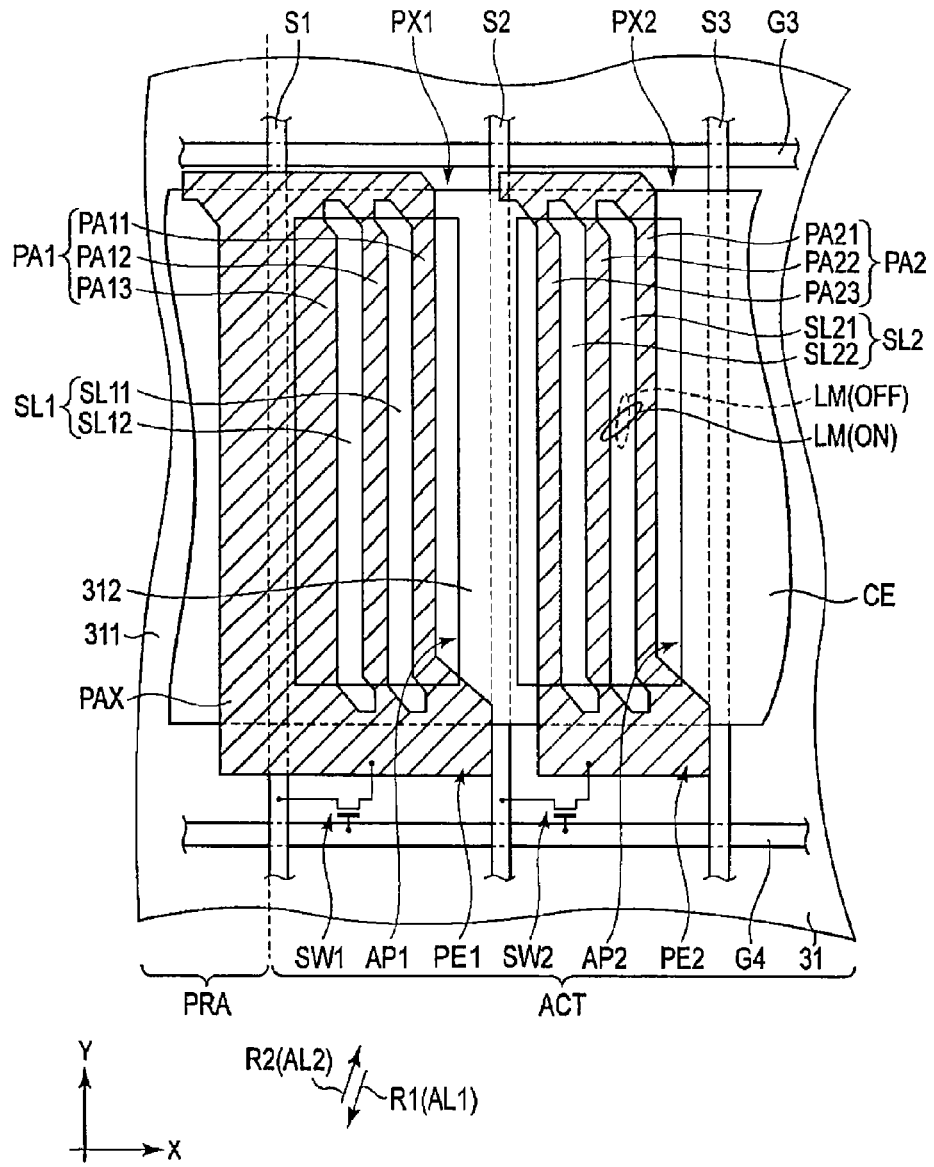
FIG. 6 is a plan view schematically showing the structure of the first pixel in the array substrate shown in FIG. 1 according to a third embodiment, when seeing from the counter substrate side.

FIG. 6 is a plan view schematically showing other structure of the first pixel in the array substrate shown in FIG. 1 according to a third embodiment, when seeing from the counter substrate side.

The structure according to this embodiment is different from the structure shown in FIG. 5 in the point that the extending portion PAX is formed by widening the electrode portion PA13 of the pixel electrode PE1. In addition, the structure of the pixel electrode PE2 is the same as that of the above-mentioned structure.

In this embodiment, the pixel electrode PE1 includes three electrode portions PA11 to PA13 arranged in the first direction X and extending in the second direction Y, respectively, and two slits SL11 and SL12 arranged in the first direction X and extending in the second direction Y, respectively. The electrode portions PA11 and PA12 have substantially the same width in the first direction X. The width of the electrode portion PA13 in the first direction X is wider than the width of the electrode portion PA12, et al., in the first direction X. The slit SL11 is formed between the electrode portion PA11 and the electrode portion PA12. The slit SL12 is formed between the electrode portion PA12 and the electrode portion PA13.

The pixel electrode PE1 is formed more widely than the pixel electrode PE2 along the first direction X and includes an extending portion PAX extending to the outside area PRA of the active area ACT. In this embodiment, the number of the first slit SL1 in the pixel electrode PE1 is the same as the number of the second slit SL2 in the pixel electrode PE2. That is, the number of the first electrode portions PA1 is the same as the number of the second electrode portions PA2.

Here, if its attention is paid to the positional relationship between the pixel electrode PE1 and the shield layer 31, the two electrode portions PA11 and PA12 in the first electrode portion PA1 which constitutes the pixel electrode PE1 are located inside of the aperture AP1. Furthermore, the slits SL11 and SL12 are located inside of the aperture AP1. That is, the electrode portion PA13 extends from a location facing the aperture AP1 to the outside area PRA of the active area ACT. While, a portion of the electrode portion PA13 is located inside of the aperture AP1, the other portion overlaps with the segment 311 of the shield layer 31. That is, the extending portion PAX corresponds to the electrode portion PA13 located in the opposite end to the pixel electrode PE2. In this embodiment, the illustrated extending portion PAX includes neither of the slits.

Also in the above structure, the same effect as the first embodiment is acquired.

As explained above, according to the embodiments, the liquid crystal display device which can control deterioration of display grace can be supplied.

In the above embodiment, while the slit SL of the pixel electrode PE is formed so that the slit SL have a long axis in parallel to the second direction Y, the slit SL may be formed so that the slit SL may have a long axis in parallel to the first direction X, Furthermore, the pixel electrode PE may be formed so that the slit SL have a long axis in a direction crossing the first direction X and second direction Y or is crooked at a sharp angle.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device, comprising:
    a first substrate including;
        a first pixel arranged in one end of an active area for displaying images, and a second pixel adjacent to the first pixel in a first direction and located inside of the active area,
        a common electrode set to a common voltage and extending to the first and second pixels,
        an insulating layer formed on the common electrode,
        a first pixel electrode formed on the insulating layer in the first pixel, the first pixel electrode including a first electrode portion forming a first slit extending in a second direction orthogonally crossing the first direction and facing the common electrode,
        a second pixel electrode formed on the insulating layer in the second pixel, the second pixel electrode including a second electrode portion forming a second slit extending in the second direction and facing the common electrode, and
        a first alignment film covering the first and second pixel electrodes,
    a second substrate including;
    a shield layer including a first segment formed in a lattice shape extending in the first and second directions in the active area and a second segment arranged outside the active area, and
    a second alignment film facing the first alignment film,
        a liquid crystal layer held between the first alignment film and the second alignment film and having liquid crystal molecules; wherein
        the first pixel electrode is formed more widely than the second pixel electrode in the first direction, and extends to outside of the active area, and
        the first pixel electrode includes an extending portion extending to outside of the active area and facing the second segment of the shield layer.

2. The liquid crystal display device according to claim 1, wherein the extending portion includes the first electrode portion arranged at an opposite end to the second pixel electrode.

3. The liquid crystal display device according to claim 2, wherein the extending portion includes the first slit.

4. The liquid crystal display device according to claim 1, wherein the number of the first slit is larger than the number of the second slit.

5. The liquid crystal display device according to claim 1, wherein the number of the first slit is the same as the number of the second slit,
    the second segment of the shield layer faces the extending portion and extends in the second direction, and
    the first slit is not arranged in the extending portion.

6. The liquid crystal display device according to claim 1, wherein
    the shield layer includes a third segment extending in the second direction and located between the first pixel electrode and the second pixel electrode in the active area, and
    respective transmissive regions are formed between the third segment of the shield layer and the first electrode portion, and between the third segment of the shield layer and the second electrode portion.

7. The liquid crystal display device according to claim 1, wherein
the second substrate includes a first color filter colored in a first color extending in the second direction in the first pixel, and a second color filter colored in a second color extending in the second direction in the second pixel.

8. The liquid crystal display device according to claim 1, wherein the liquid crystal molecules are driven by a Fringe Field Switching (FFS) mode.

9. A liquid crystal display device including a plurality of pixels, comprising:
a first substrate including;
gate lines extending in a first direction,
source lines extending in a second direction orthogonally crossing the first direction,
a first pixel arranged in an outermost circumference of an active area displaying images, and a second pixel arranged adjoining the first pixel in a first direction so as to locate more inside of the active area than the first pixel, the first and second pixels defined by the adjoining gate lines and the source lines,
a common electrode set to a common voltage extending to the first and second pixels,
an insulating layer formed on the common electrode, a first pixel electrode formed on the insulating layer in the first pixel, the first pixel electrode including a first electrode portion forming a first slit extending in a second direction orthogonally crossing the first direction and facing the common electrode, a second pixel electrode formed on the insulating layer in the second pixel, the second pixel electrode including a second electrode portion forming a second slit extending in the second direction and facing the common electrode, and a first alignment film covering the first and second pixel electrodes, a second substrate including;
a shield layer including a first segment formed in a lattice shape extending in the first and second directions in the active area and a second segment arranged outside the active area, and
a second alignment film facing the first alignment film,
a liquid crystal layer held between the first alignment film and the second alignment film and having liquid crystal molecules; wherein
the first pixel electrode is formed more widely than the second pixel electrode in the first direction, and extends to outside of the active area,
the first pixel electrode includes an extending portion extending to outside of the active area and facing the second segment of the shield layer, and
the first electrode portion is arranged in the extending portion facing the shield layer.

10. The liquid crystal display device according to claim 9, wherein the first electrode portion arranged in the extending portion of the first pixel electrode includes the first slit.

11. The liquid crystal display device according to claim 9, wherein the number of the first slit is larger than the number of the second slit.

12. The liquid crystal display device according to claim 9, wherein
the shield layer includes a third segment extending in the second direction and located between the first pixel electrode and the second pixel electrode, and
respective transmissive regions are formed between the third segment of the shield layer and the first electrode portion, and between the third segment of the shield layer and the second electrode portion.

13. The liquid crystal display device according to claim 9, wherein
the liquid crystal molecules are driven by a Fringe Field Switching (FFS) mode.

14. The liquid crystal display device according to claim 9, wherein
the second substrate includes a first color filter colored in a first color extending in the second direction in the first pixel, and a second color filter colored in a second color extending in the second direction in the second pixel.

* * * * *